US007860751B2

(12) United States Patent
Mangalick et al.

(10) Patent No.: US 7,860,751 B2
(45) Date of Patent: Dec. 28, 2010

(54) CROSS DOMAIN CUSTOMER INTERFACE UPDATES

(75) Inventors: Piyush Mangalick, Los Altos, CA (US); Timothy M. Dierks, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 637 days.

(21) Appl. No.: 11/476,468

(22) Filed: Jun. 27, 2006

(65) Prior Publication Data

US 2007/0299735 A1 Dec. 27, 2007

(51) Int. Cl.
G06Q 30/00 (2006.01)
(52) U.S. Cl. .......................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,889,863 A * | 3/1999 | Weber ........................ | 705/76 |
| 5,999,914 A | 12/1999 | Blinn et al. | |
| 6,029,141 A | 2/2000 | Bezos et al. | |
| 6,134,307 A | 10/2000 | Brouckman et al. | |
| 6,499,052 B1 | 12/2002 | Hoang et al. | |
| 6,850,917 B1 | 2/2005 | Hom et al. | |
| 6,925,444 B1 | 8/2005 | McCollom et al. | |
| 6,934,690 B1 | 8/2005 | Van Horn et al. | |
| 7,089,198 B2 | 8/2006 | Freedenberg et al. | |
| 7,197,475 B1 | 3/2007 | Lorenzen et al. | |
| 2001/0007099 A1 | 7/2001 | Rau et al. | |
| 2002/0016765 A1 * | 2/2002 | Sacks ........................ | 705/39 |
| 2002/0016766 A1 | 2/2002 | Raja | |
| 2002/0052792 A1 | 5/2002 | Johnson et al. | |
| 2002/0107772 A1 | 8/2002 | Jain et al. | |
| 2002/0120475 A1 | 8/2002 | Morimoto | |
| 2002/0120530 A1 | 8/2002 | Sutton et al. | |
| 2002/0120864 A1 | 8/2002 | Wu et al. | |
| 2002/0147658 A1 * | 10/2002 | Kwan .......................... | 705/26 |
| 2002/0194087 A1 | 12/2002 | Spiegel et al. | |
| 2003/0033205 A1 | 2/2003 | Nowers et al. | |
| 2003/0050855 A1 | 3/2003 | Jaffe et al. | |
| 2003/0065577 A1 | 4/2003 | Haynes et al. | |
| 2003/0093320 A1 | 5/2003 | Sullivan | |
| 2004/0002906 A1 | 1/2004 | Von Drehnen et al. | |
| 2004/0030619 A1 | 2/2004 | Stokes et al. | |

(Continued)

FOREIGN PATENT DOCUMENTS

WO    WO 02/29508 A2    4/2002

OTHER PUBLICATIONS

Matlis, Jan; "Quick Study: AJAX" Computerworld, Jul 11, 2005, v59i28pg34; Proquest #867593071, 4pgs.*

(Continued)

*Primary Examiner*—Robert M. Pond
(74) *Attorney, Agent, or Firm*—Fenwick & West LLP

(57) ABSTRACT

A methodology and system for allowing a third-party system to institute online commerce services such as a shipping service. In the described embodiments, a third-party web page and/or a third party server sends and receives information from a merchant server to seamlessly update information used in the display without requiring the customer to perform additional mouse clicks. In some embodiments, sending and receiving information can be performed across address domains.

31 Claims, 8 Drawing Sheets

U.S. PATENT DOCUMENTS

| | | | |
|---|---|---|---|
| 2004/0073498 | A1 | 4/2004 | Breen et al. |
| 2004/0117261 | A1 | 6/2004 | Walker et al. |
| 2004/0254844 | A1 | 12/2004 | Torres |
| 2005/0033694 | A1 | 2/2005 | Perrin |
| 2005/0108104 | A1 | 5/2005 | Woo |
| 2005/0204041 | A1* | 9/2005 | Blinn et al. ............ 709/225 |
| 2005/0228750 | A1 | 10/2005 | Olliphant et al. |
| 2005/0251410 | A1* | 11/2005 | Kahn ............... 705/1 |
| 2005/0256806 | A1 | 11/2005 | Tien et al. |
| 2006/0097044 | A1 | 5/2006 | Boyd et al. |
| 2006/0122895 | A1 | 6/2006 | Abraham et al. |
| 2006/0248011 | A1 | 11/2006 | Hecht-Nielsen et al. |
| 2007/0043636 | A1 | 2/2007 | Foster |
| 2007/0101258 | A1* | 5/2007 | Xu et al. ............ 715/516 |
| 2007/0271149 | A1* | 11/2007 | Siegel et al. ............ 705/26 |
| 2007/0299733 | A1 | 12/2007 | Derby et al. |
| 2008/0120129 | A1 | 5/2008 | Seubert et al. |

OTHER PUBLICATIONS

Bruno, Eric; "AJAX: Asynchronous JavaScript and XML," Dr. Dobb's Journal, Feb 2006, v31i2pg32; Proquest #973192671, 9pgs.*

Rubenstein, David; "Adobe Flex-ible enough to stretch AJAX applications," Software Development, May 1, 2006, i149pg20; Proquest #1222741411, 2pgs.*

"Dynamic HTML and XML: The XMLHttpRequest Object," Apple Computer, Inc., Developer Connection, Jun. 24, 2005, 6 pages, [online] [retrieved on Jan. 3, 2006] Retrieved from the Internet: <URL: http://developer.apple.com/internet/webcontent/xmlhttpreq.html>.

Crockford D., "JavaScript Object Notation (JSON)", [online] [retrieved on June 26,2006] Retrieved from the internet < URL: http://www.jetf.org/internet-drafts/draft-crockford:jsonorg-json-04.txt>.

"Auto-Completion with AJAX: Design Details," Sun Microsystems, 2005, [online] [Retrieved on Jul. 18, 2006] Retrieved from the Internet<URL:https://bpcatalog.dev.java.net/nonav/ajax/autocomplete/design.html>.

"DHTMLCentral.com—CoolMenus—Dynamic HTML menu script," DHTMLCentral.com, Bratta Communications, 2000-2002, [online] [Retrieved on Jul. 18, 2006] Retrieved from the Internet<URL:http://www.dhtmlcentral.com/projects/coolmenus/?m=31>.

"DHTML Menu, Cross Browser JavaScript Menus and Toolbar [Dynarch.com]," [online] [Retrieved on Oct. 24, 2005] Retrieved from the Internet<URL:http://www.dynarch.com/products/dhtml-menu/>.

Garrett, J.J., "AJAX: A New Approach to Web Applications," Adaptive Path, LLC, 2006, [online] [Retrieved on Sep. 21, 2005] Retrieved from the Internet<URL:http://www.adaptivepath.com/publications/essays/archives/000385.php>.

Garrett, J.J., "AJAX: A New Approach to Web Applications," Adaptive Path, LLC, 2006, [online] [Retrieved on Jul. 18, 2006] Retrieved from the Internet<URL:http://www.adaptivepath.com/publications/essays/archives/000385.php>.

Garrett, J.J., "The Elements of User Experience," Mar. 30, 2000, [online] Retrieved from the Internet<URL:http://www.jjg.net/ia/>.

The Gurteen Knowledge Website, [online] [Retrieved on Jan. 4, 2006] Retrieved from the Internet<URL:http://www.gurteen.com/gurteen/gurteen.nsf/0/7B4F85EFABF4711F80256AB9000B6f3e/>.

"HTTP Asynchronous Client Notifications," Technical Whitepaper by Clipcode.com, [online] [Retreived on Sep. 21, 2005] Retrieved on the Internet<URL:http://www.clipcode.org/messaging/http_async_notif.html>.

Jesdanun, A., "Taking Aim at Microsoft," San Jose Mercury News, Oct. 24, 2005, 3 pages.

Justus, C., "Server Side Guy: Google Suggest Dissected . . ." Dec. 14, 2004, [online] [Retrieved on Jul. 18, 2006] Retrieved from the Internet<URL:http://serversideguy.blogspot.com/2004/12/google-suggest-dissected.html.

Khare, R., "Beyond AJAX: Accelerating Web Applications with Real-Time Event Notification," Aug. 2005, pp. 1-10.

Mclellan, D., "Very Dynamic Web Interfaces,". XML.com, Feb. 9, 2005, [online] [Retrieved on Sep. 21, 2005] Retrieved from the Internet<URL:http://www.xml.com/pub/a/2005/02/09/xml-httprequest.html>.

Murray, G., Asynchronous JavaScript Technology and XML (AJAX) with Java 2 Platform, Enterprise Editior Jun. 9, 2005, [online] [Retrieved on Oct. 27, 2005] Retrieved from the Internet<URL:http://java.sun.com/developer/technicalArticles/J2EE/AJAX>.

Norbye, T., "AJAX Auto-Completion Custom JSF Component: Design Details," Sun Microsystems, 2005, [online] [Retrieved on Oct. 24, 2005] Retrieved from the Internet<URl:http://bpcatalog.dev.java.net/ajax/textfield-jsf/design.html>.

Russell, A., "Learning AJAX," OSCON '05 Tutorial Session.

"Wick: Web Input Completion Kit," SourceForge™ .net, [online] [Retrieved on Jul. 18, 2006] Retrieved from the Internet<URL:http://wick.wick.sourceforge.net/>.

PCT International Search Report and Written Opinion, PCT/US07/72213, Sep. 8, 2008, 11 pages.

PCT International Search Report and Written Opinion, PCT/US07/72269, Aug. 14, 2008, 12 pages.

PCT International Search Report and Written Opinion, PCT/US06/14251, Sep. 10, 2007, 7 pages.

"Happy Birthday Yahoo! Canada Shopping", Canada NewsWire. Ottawa: Nov 26, 2001, pg. 1, [online] [retrieved on Jul. 8, 2009] Retrieved from the internet <URL:http://proquest.umi.com/pqdweb?did=916591 03&sid=5&Fmt=3&clientld=19649&RQT=309&VName=PQD>.

Non-Final Office Action, U.S. Appl. No. 11/426,838, Jun. 8, 2009, 22 pages.

Bruno, E., "AJAX: Asynchronous JavaScript and XML," Dr. Dobb's Journal, Feb. 2006.

Matlis, J., "Quick Study: AJAX," Computerworld, Jul. 11, 2005, 4 pages.

Rubenstein, D., "Adobe Flex-ible enough to stretch AJAX applications," Software Development, May 1, 2006, 2 pages.

Office Action for U.S. Appl. No. 11/426,838, Dec. 31, 2009,18 pages.

* cited by examiner

Checkout page

Name:
Address:
City:
State:
Zip:

Order Total is: $160.64
Shipping Total is: _____
Total Charge is: _____

Continue

Fig. 3(a) Before Update

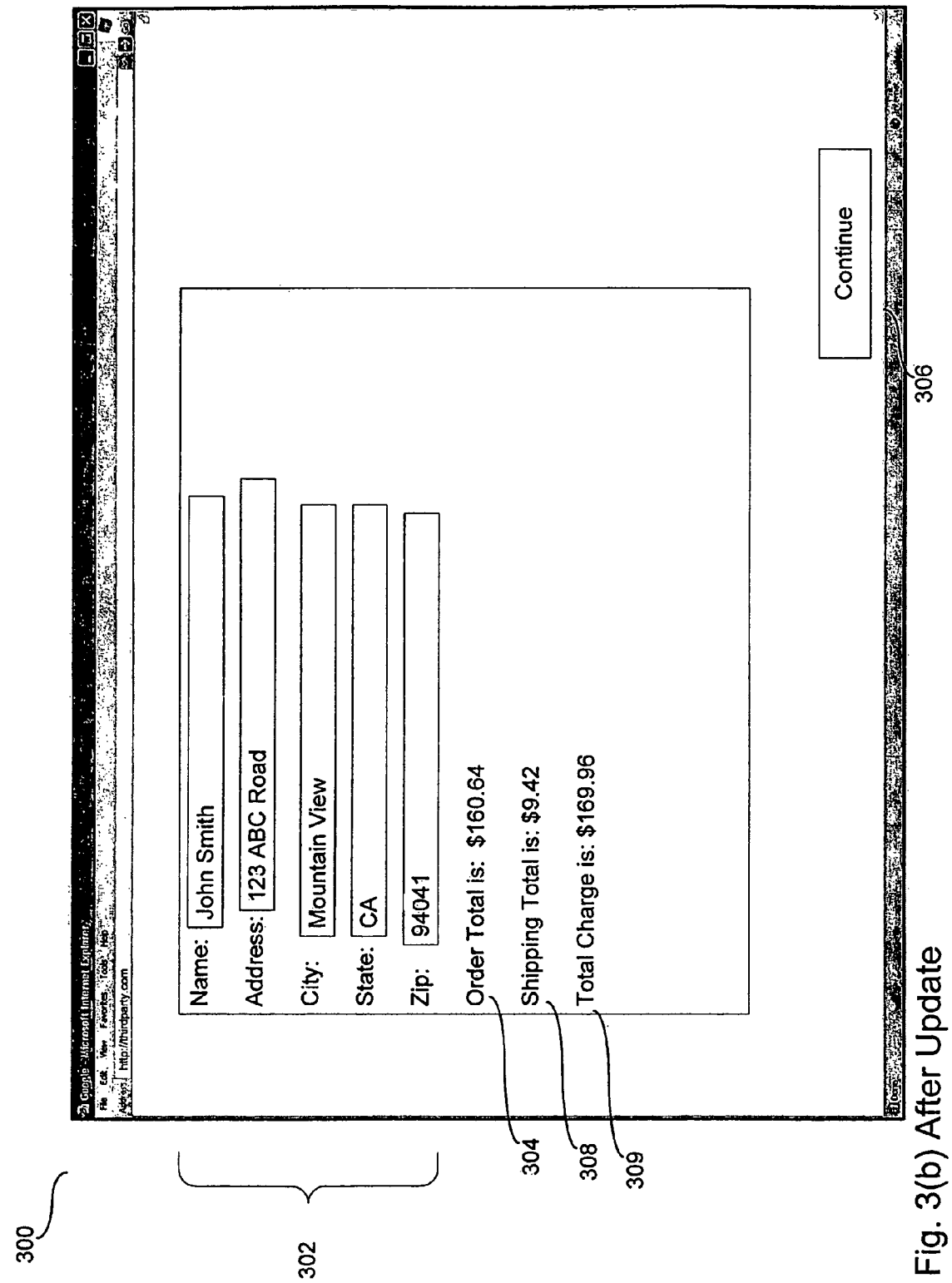
Fig. 3(b) After Update

CROSS DOMAIN CUSTOMER INTERFACE UPDATES

BACKGROUND OF THE INVENTION

1. Field of the Invention

This invention pertains in general to transmission of information over a network and, in particular, to transmission of information between multiple elements in an online commerce system.

2. Description of the Related Art

Merchants routinely offer their products and services to customers via the World Wide Web. Online stores and shopping carts are common and well-known. More recently, merchants have begun using third-party services to implement their online commerce activities. For example, third-parties are used to serve ads to a merchant's web site.

Merchants are continually trying to improve the shopping experience of their online customers. They try to design web sites that are easy to use and that make the online shopping experience pleasant. For example, merchants try to design sites that minimize the number of mouse clicks that a customer needs to complete a purchase.

Conventional web pages are sometimes implemented using Dynamic HTML (DHTML) as a way of minimizing customer clicks. Dynamic HTML loads a web page, along with content that may be displayed when the customer performs certain actions. One problem with DHTML is that all possible display information must be loaded with the web page, whether the information will be used or not. This increases the download time of a page and adversely affects bandwidth. Moreover, DHTML is not appropriate for certain types of applications, such as online commerce, where there are large numbers of options and combinations that a customer could choose. To download a DHTML page covering all possible options for an online commerce application would require an unreasonably large amount of data, possibly even an entire rule base, to be downloaded with the page.

What is needed is a way to improve the usability of online commerce web sites.

BRIEF SUMMARY OF THE INVENTION

The present invention is a methodology and system for allowing a third-party server to institute online commerce services such as a credit card service or shipping service. In the described embodiments, a third-party web page (or server) sends and receives information to and from the merchant to seamlessly update information used in a transaction without requiring that the customer perform additional mouse clicks in order to obtain the updated information.

For example, when the customer clicks on a "Checkout" button on the merchant's page, he may be transferred to a third-party page (or server) that performs functions associated with checkout (for example, processing credit cards or figuring shipping). The third-party web page sends and receives information to and from the merchant to seamlessly update information used in the calculation. Thus, the customer does not need to share his personal information with the merchant. He only shares personal information with the trusted third-party. For example, the third party could be a trusted holder of credit card numbers that are not shared with the merchant.

In some embodiments, the third party web page contains executable instructions that communicate with the merchant server. In other embodiments, the third party web page contains executable instructions that communicate with the merchant server via a third party server.

In some embodiments, sending and receiving information cannot be performed across address domains. In this situation, the third-party web page communicates with a third-party server in the same domain using an AJAX object and the third-party server communicates with the merchant server in a different domain to send and receive data.

The present invention further has embodiments in computer program products, in computer systems, and computer customer interfaces, which variously perform or cooperate in the operation or use of the foregoing method (or its alternative embodiments and features).

BRIEF DESCRIPTION OF THE DRAWINGS

FIGS. 3(a) and 3(b) show an example third-party web site before and after receiving shipping cost information from a merchant server.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

XML (Extensible Markup Language) is a simple format that allows data to be exchanged over the web. Javascript is a client-side language that is loaded as part of a web page and that executes inside a browser. AJAX (Asynchronous Javascript and XML) allows Javascript programs in the browser to send XML data to other web pages through http requests like POST. Thus, a Javascript program can execute in a user's browser and exchange XML data behind the scenes on an as-needed basis. For example, using AJAX, a Javascript program can send and receive XML data without waiting for customer input indicating that the exchange should occur).

AJAX currently contains built-in security restrictions. Most importantly, certain http requests executed by a browser cannot cross address domain boundaries. Thus, if Javascript is loaded from a first server as part of a web page, the Javascript can use AJAX to exchange data with the first server (and other servers in that domain) but cannot exchange data with a server in a different domain. This limitation, while desirable from a security standpoint, limits the usefulness of AJAX in developing online commerce web sites because it means that a third-party online commerce site cannot use AJAX to communicate with the merchant's server since the merchant's server is part of a different address domain.

Figure 1:
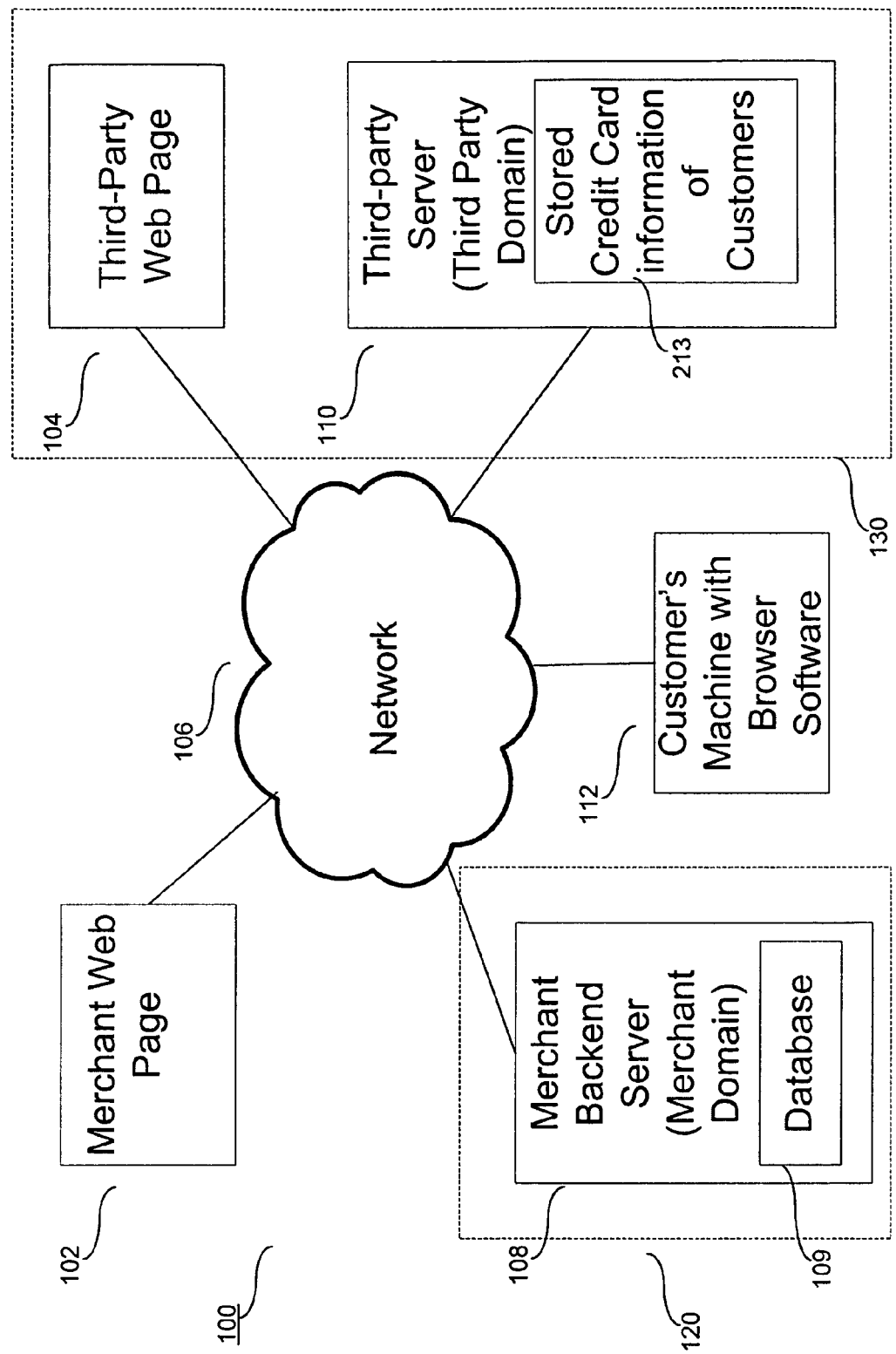
FIG. 1 shows a system architecture, in accordance with a preferred embodiment of the invention.

FIG. 1 shows a system architecture, in accordance with a preferred embodiment of the invention. FIG. 1 shows a merchant web page 102 and a third-party web page 104. In some embodiments, these web pages are preferably stored on respective servers in different address domains. FIG. 1 also shows a network 106, which can be the Internet or any other appropriate network that allows the elements of FIG. 1 to communicate. FIG. 1 also shows a merchant backend server 108 having a database 109. Database 109 can include, for example, information about shipping costs for various shipping methods, weights, and destinations. These values may be specific to the merchant. Database 109 can also include, for example, information about state tax rates, county taxes or taxes of other municipalities. Database 109 can also include information about the types of items that should be taxed in a specific geographical area (e.g., food items vs. non-food items). Database 109 can also include information about coupon codes, promotion codes, gift certificates, gift cards, rebates, and catalog codes for various geographical areas for the merchant. FIG. 1 also includes a third-party server 110 and a customer browser 112. Third-party server 110 allows customers to shop more confidently and to purchase items from sites that they would not otherwise trust by storing their credit card information 213 on one central, trusted site. Third-party server 110 also allows customers to track their purchases made at various web sites but paid for at a central location.

This tracking is accomplished, for example, by having merchants pass their shopping cart information (which contains items that customers want to buy) to the third-party server. The third-party server 110, then displays a secure page, along with a sign-in for the customer's account. Once the customer signs in, he can choose a ship-to address, as well as a payment type.

Customer browser 112 is used by a customer who wants to buy items from the merchant web site 102. In this example, merchant backend server 108 is in the address domain merchant.com 120, while third-party web page 104 and third-party server 110 are in the address domain thirdparty.com 130. The Figure does not specify whether the merchant web page and merchant server are in the same domain although they could be. In other embodiments, the various elements of FIG. 1 are in various combinations of the same or different domains and all combinations fall within the spirit of the present invention. In some embodiments, the elements of FIG. 1 are on the same or different machines. In some embodiments, the various elements of FIG. 1 are directly connected, connected wirelessly, or are connected via a wired network.

Figure 2:
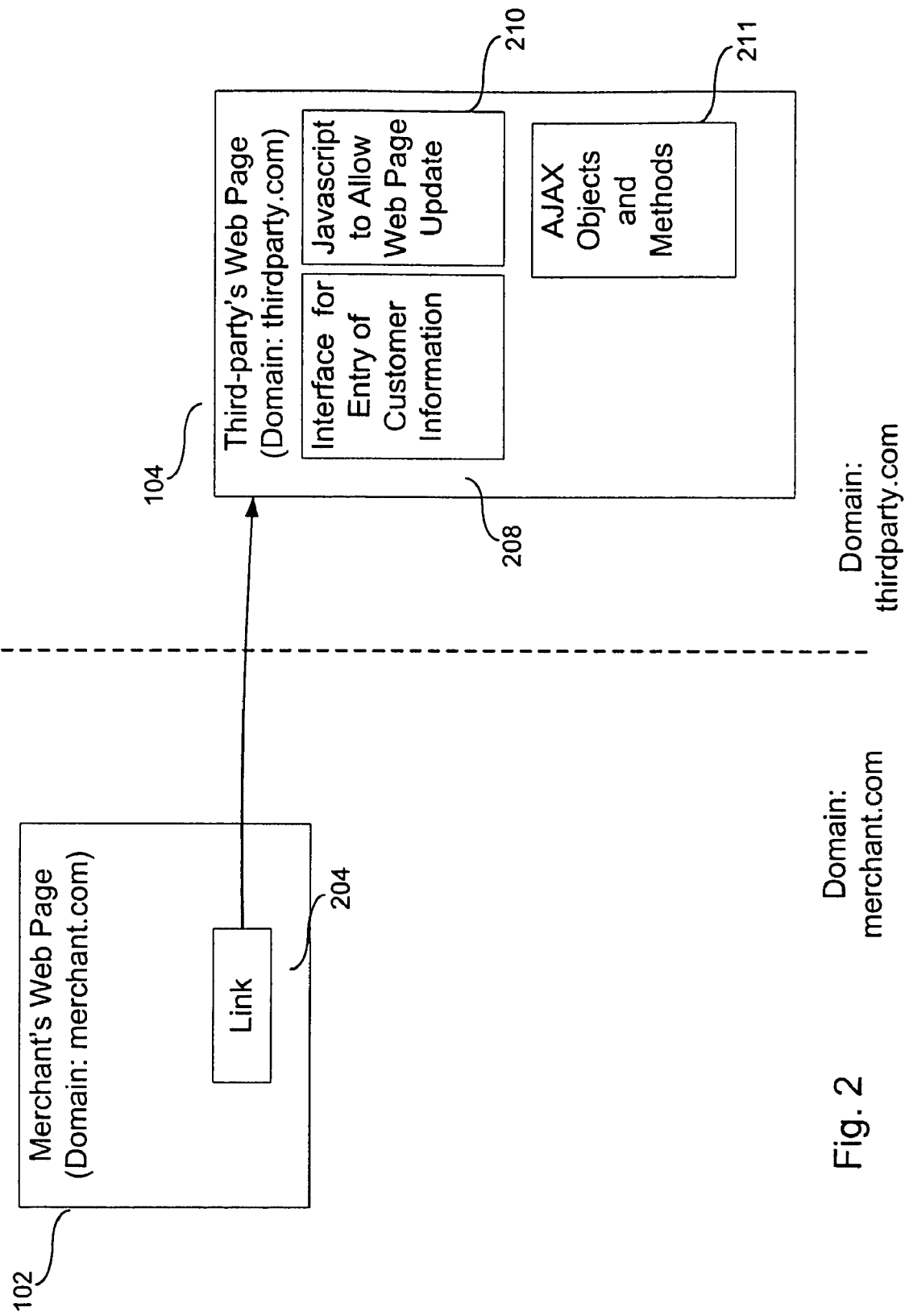
FIG. 2 shows an example merchant's web page with a link to a third-party web site.

FIG. 2 shows an example merchant's web page 102 with a link 204 to the third-party web page 104 (for example, via the third party server). Third-party web page 104 includes program code instructions 208 to query a customer for information, such as the customer's shipping address or home address. Third-party web page 104 also includes program code instructions 210, such as Javascript, to update the third-party web page without requiring mouse clicks from the customer, as described below. Third-party web page 104 also contains AJAX objects and methods 211.

In one embodiment, as shown in FIG. 2, communication with the merchant server is initiated by instructions on the third party web page. In one embodiment, communication with the third party server is effected by the third party web page communicating with the third party server, which communicates with the merchant server. In addition to the implementation discussed above, the invention may be implemented using other appropriate technologies in addition to AJAX, such as iframes, using javascript to pull data back into the third party web page. The invention can also be implemented, for example, by use of json (Javascript object notation), as described, for example, in the Internet Draft entitled "JavaScript Object Notation JSON)" by D. Crockford, February 2006, which is herein incorporated by reference.

FIGS. 3(a) and 3(b) show an example third-party web site 104 displayed before and after receiving shipping cost information from a merchant server. FIG. 3(a) shows Checkout page 104 having an area 302 used to query the customer for his address. In the example, the customer has not yet entered any information. Page 104 also has an area 304 showing a total cost of the items ordered by the customer via merchant page 102. These items (and possibly their cost) were previously transferred to the checkout page 104 from the merchant page 102. Page 104 also has areas 308 and 309 that do not yet contain shipping costs for the items.

In this example, the shipping cost in area 308 is initially unknown because shipping costs are dependent on the address of the customer, which is also initially unknown. In some embodiments, each merchant has a merchant-specific method of calculating shipping charges. For example, some merchants may have free shipping or may give rebates to certain customers. In some embodiments, the merchant sends an estimate shipping cost or an initial shipping cost is provided by the third-party page 104, and the initial estimate is updated as discussed below. In other embodiments, the shipping cost 308 and total charge 309 are initially blank, as shown here, and are updated as discussed below. Lastly, page 104 includes a "Continue" button 306 that the customer will ultimately click when he is ready to checkout. It is important to note that the customer does not have to perform any mouse clicks to cause an update of the shipping cost in area 308.

While this example shows shipping cost 308 (and possibly total charge 309) as the information that needs to be updated, other embodiments update state tax rate and restriction information or information about shipping restrictions to certain locations. Other embodiments update pricing changes due to coupons, rebates, refunds, inventory availability, promotion codes, discount codes, catalog codes, gift certificates, or gift cards. Other embodiments update combinations of these.

FIG. 3(b) shows web third-party web page 104 with the shipping information 308 updated to show a final shipping cost. From the customer's point of view, he simply enters his address and the shipping information 308 and total charge 309 automatically update. The customer does not need to take any action, such as clicking an update button to update areas 308, 309 after he types his address. Behind the scenes, as will be discussed below, third-party web page 104 (or third party server 110) updates area 308 by communicating with merchant server 108 without requiring that the customer performs any web clicks to cause the update. In the described embodiment, the third-party server calculates total charge 309 once he receives a shipping cost from the merchant server. In other embodiments, the total charge might also be calculated at the merchant server.

In some embodiments, a web page such as that shown in FIGS. 3(a) and 3(b) might also contain other information such as a listing of items that the customer wants to purchase.

Figure 4A:
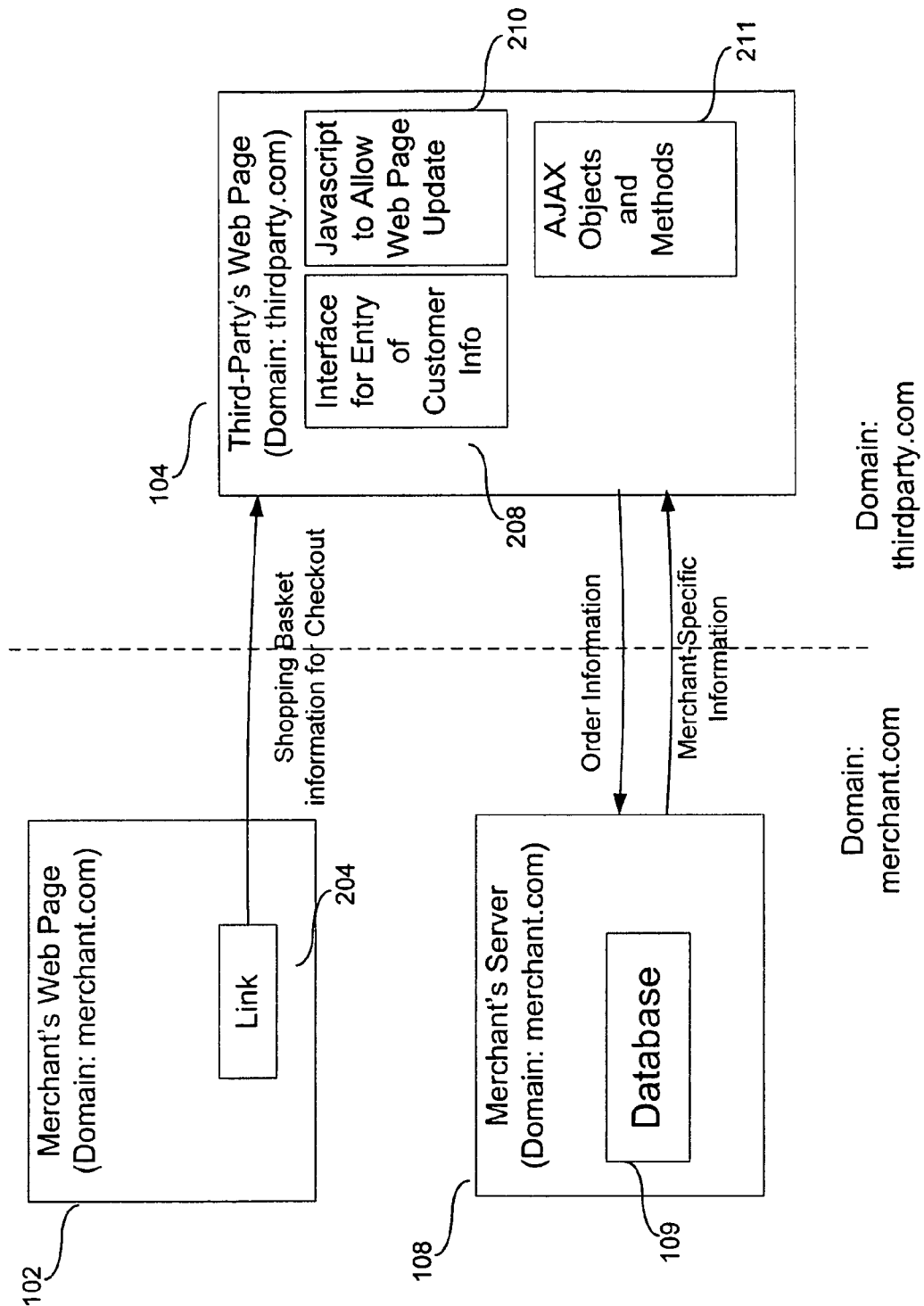
FIGS. 4(a) and 4(b) show examples of a third-party web site communicating with a merchant server in accordance with embodiments of the present invention.
Figure 4B:
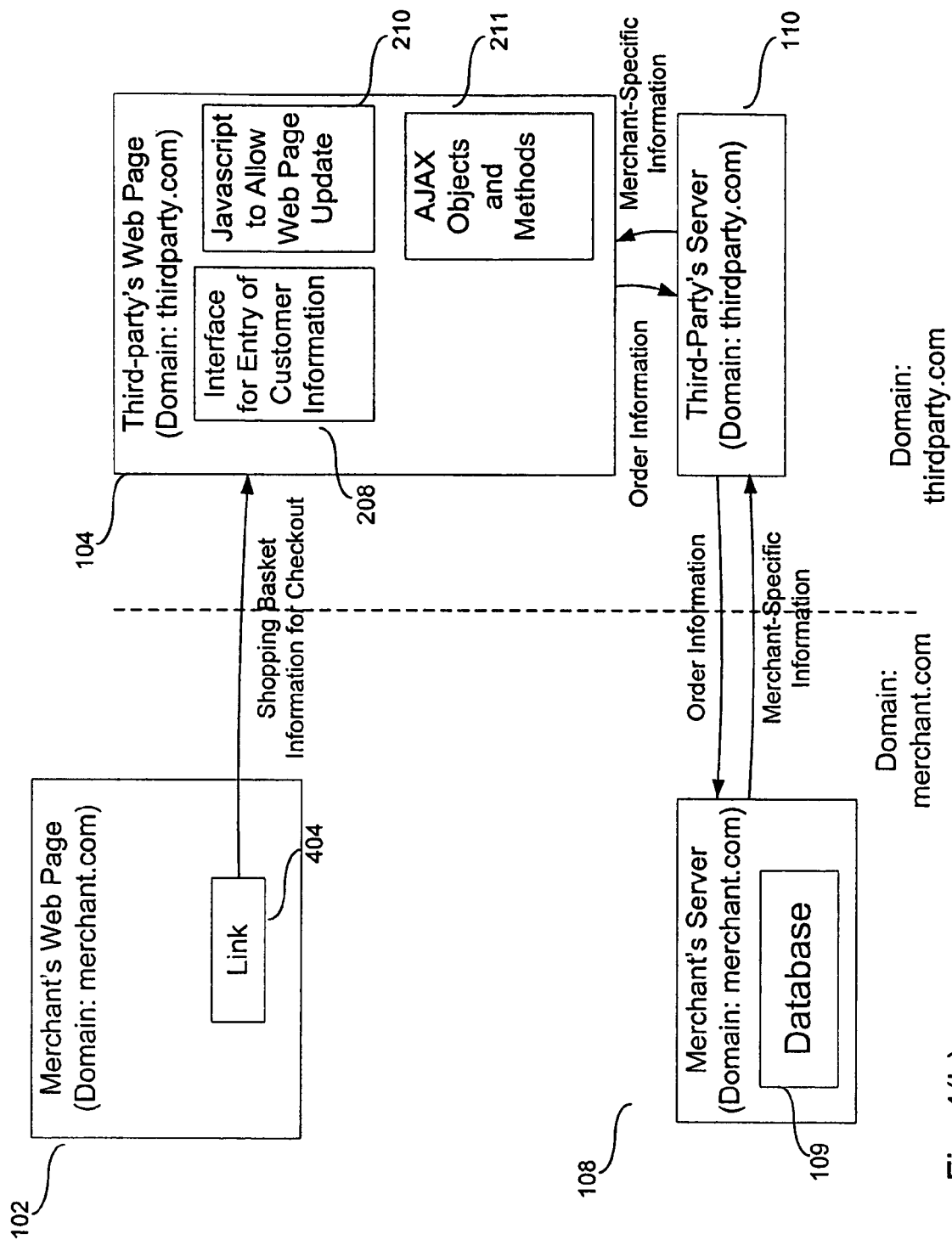

FIGS. 4(a) and 4(b) show examples of a third-party web site 104 (served from a third-party server) communicating with a merchant server 108 in accordance with embodiments of the present invention. FIG. 4(a) shows an example in which either of the elements 108, 104 are all in the same domain or in which there are no domain restrictions on AJAX calls. The examples of FIGS. 4(a) and 4(b) show that a server for a merchant's web page 102 and merchant's server 108 are both in the same domain (merchant.com). In other embodiments, the server serving a merchant's web page and a server providing merchant-specific information may be in different domains and may be controlled by the same or by different entities. For example, a server providing merchant-specific information may be controlled by the merchant or by another third-party who offers such a service to merchants. In FIG. 4(a), a customer enters the items he wants to buy into his shopping basket. The shopping basket information is passed from merchant's web page 102 to third-party web page 104. In FIG. 4(a), once the customer is queried for his address by third-party web page 104, and the customer enters his address (and possibly other data), third-party web page 104 communicates with the merchant server 108 to obtain merchant-specific information (such as shipping cost) based on the information entered by the customer or known to the merchant or third-party). In one embodiment, the third-party sends the entire order information to the merchant server. In this embodiment, order information includes but is not limited to the address entered by the customer and the items being purchased by the customer. In another embodiment, the third-party sends a subset of the order information, such as address, zip code or other information for the customer. In another embodiment, the third-party sends order information or a subset thereof plus predetermined information stored at the third-party, such as a flag or indicator value. In the embodiment, database 109 contains information in the form of a database, table, rule set, or similar structure that sets out how to calculate the requested merchant-specific information. In one embodiment, the third-party can request different types of merchant-specific information as needed. The requested merchant-specific information is then sent back to the third-party web page 104 and is used to update the displayed page or for other processing. In other embodiments, instead of a value (such as dollar amount), a message code and/or test message could also be passed back.

As discussed above, in some embodiments, the third party web page contains instructions that communicate with a third party server, which then communicates with the merchant backend. This may be done whether or not there are domain restrictions existent, such as those discussed herein.

FIG. 4(b) shows an example in which the AJAX restriction on sending information from a browser across domains applies. Here, the third-party web page 104 uses AJAX to pass the customer's address to a third-party server 110 that is in the same domain as the third-party web site. This avoids the restriction that browsers cannot make AJAX calls across domains since the third-party server 110 is in the same domain. The third-party server 110 then communicates via standard http operations with the merchant server 108 to obtain the final shipping information and passes the received merchant-specific information to the requesting web page 104 through an AJAX callback mechanism.

In the described embodiments, information is passed by executing Javascript on the third-party web page 104 which accesses an AJAX XMLHttpRequest object in objects 211. This allows HTTP requests to be made and responses received, completely in the background and without the customer experiencing any visual interruptions. The returned merchant-specific information is preferably transmitted using XML and the third-party web page is most typically updated by modifying DHTML screen elements of page 104. In one embodiment, the OnChange function is used to instigate passing address information to the merchant server. In another embodiment, the or OnBlur Javascript function is used to instigate passing address information to the merchant server. In other embodiments, other triggers might be OnPress, OnKeyPressUp, OnClick, and others. In another embodiment, events are triggered periodically through a Javascript timer.

Figure 5:
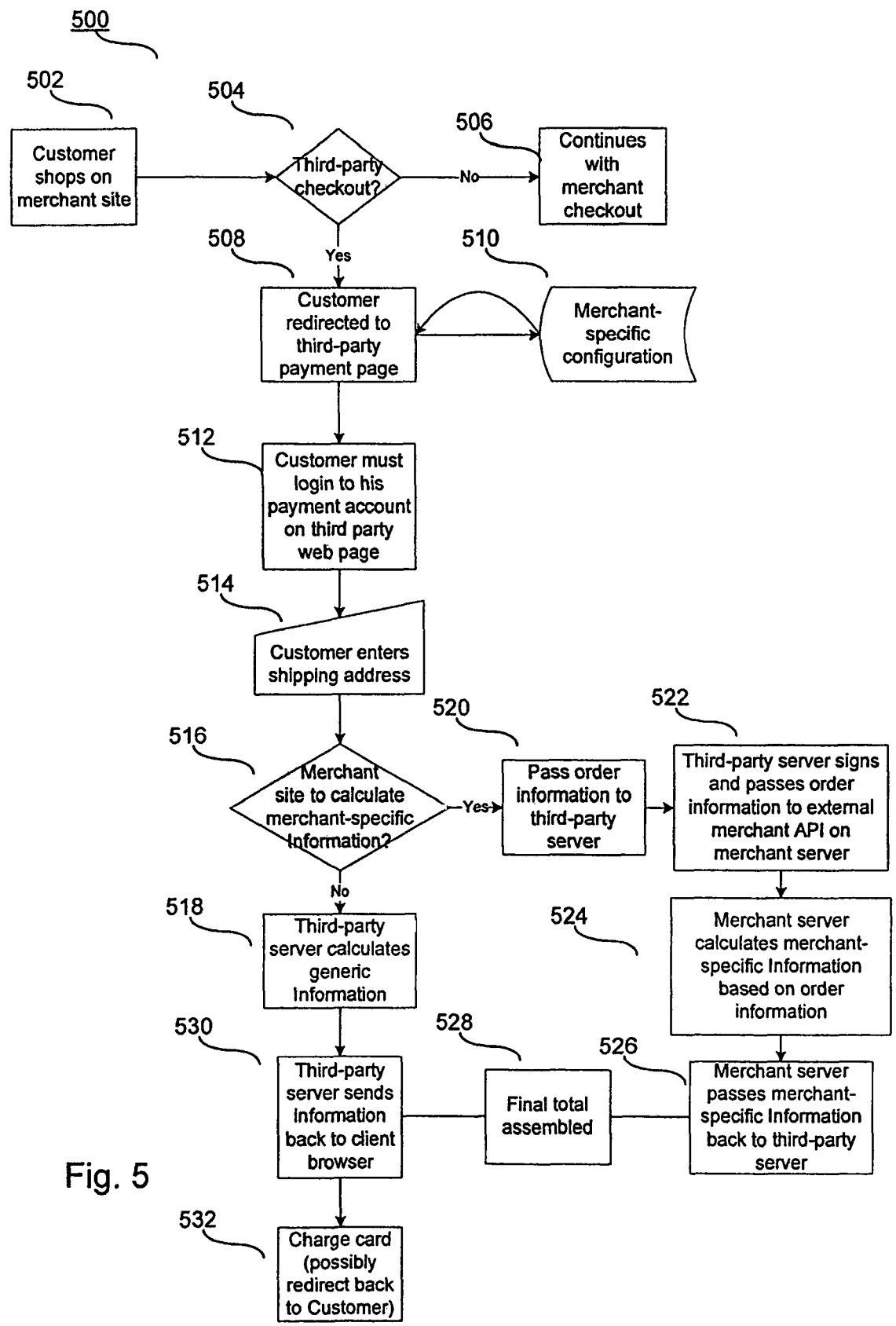
FIG. 5 is a flow chart showing a method of updating a third-party web site screen from another domain and without requiring customer input, in accordance with a first embodiment of the invention.

FIG. 5 is a flow chart showing a method of updating a third-party web page 104 from another domain and without requiring customer input, in accordance with a first embodiment of the invention. The process begins with a customer shopping 502 on the merchant site having page 102. If the customer wants to check out 504 but does not use a third-party checkout (either by choice or because it is not available) the process ends and checkout on the merchant site 506 continues.

Otherwise, if checkout is by third-party site, the control is redirected 508 to third-party payment web page 104. In some embodiments, the third-party web page is configured differently for each merchant. This can be accomplished, for example, via a database or some configuration file 510 (XML webconfig file that has merchant-specific information keyed on the merchant's unique id). In one embodiment, information is transferred about a customer transaction, such as identification of an item that the customer wants to buy from the merchant.

Next, the customer logs into 512 his third-party payment account (if log-in is required). Note that this invention can also be used to transmit data in situations where the customer is not required to login.

The customer is queried 514 for his address using a page similar to that of FIG. 3(a). If the merchant config information indicates 516 that the merchant site is not to calculate merchant-specific information such as shipping, then the third-party calculates 518 the merchant-specific information (and any other required information, such as taxes or shipping restrictions, etc.).

Then the order information including, for example the ordered items and/or the customer's address (at least the zip code) is passed 520 to the third-party server 110, which is in the same domain as the third-party web page 104. Use of third-party server 110 avoids the Javascript proscriptions on crossing domain boundaries. Third-party server 110 then signs and passes 522 the information to the merchant server 108. The merchant server calculates 524 the requested merchant-specific information, such as shipping charges (or other requested information) based on the order information. The merchant server 108 passes 526 the merchant-specific information to the third-party server 110, which in turn, calculates a total (including, for example, total cost, taxes, and shipping less rebates, coupons, or refunds) if needed 528 and passes 530 the data to the requesting web page 104. In one embodiment, the item that the customer wants to purchase may affect the shipping information if there is a special on particular items. Thus, it would be important in this example to send at least an identification of the items purchased to the merchant server 108. In another embodiment, items totaling more than a predetermined amount may have free shipping. In this example, it would be important to include at least item prices or an item total. Database 109 on the merchant server 108 can contain, for example information about state tax rates, county taxes or other municipalities. Database 109 can also include information about the types of items that should be taxed (e.g., food items vs. non-food items). Database 109 can also include information about coupon codes, promotion codes, gift certificates, gift cards, rebates, and catalog codes for various geographical areas. Thus, the merchant-specific information returned from the merchant server 108 can relate, for example, to shipping cost, taxes (for example, food vs. non-food), rebates, coupon savings, and so on. In one embodiment, merchant-specific information from server 108 is returned and a total is determined by the third-party page. Note that in this embodiment communication between page 104 and server 110 uses AJAX calls, while communication between third-party server 110 and merchant server 108 does not.

The described method allows merchants to utilize complex shipping terms and to change these terms frequently. However, there is a risk that the merchant server 108 goes down and cannot be contacted (or other "error" return code). In one embodiment, the method defaults to a "FREE Shipping Promotion" shipping method in this circumstance. This will also motivate merchants to keep their systems running and their code tested In some embodiments, a similar process is performed to process credit card information 532 or inventory availability, rebates, gift certificates, gift cards, coupons, discounts, promo codes, and catalog codes.

Figure 6:
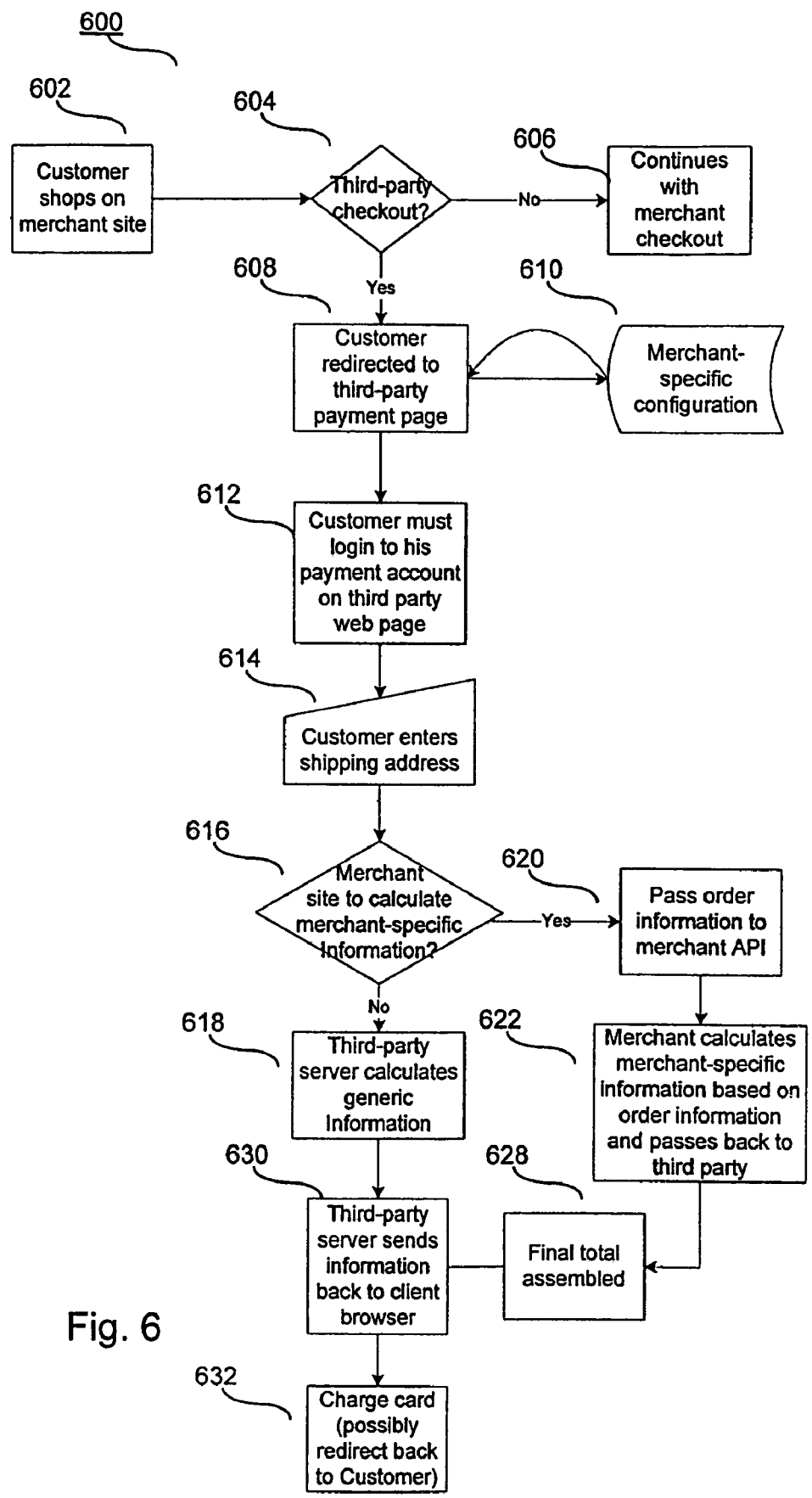
FIG. 6 is a flow chart showing a method of updating a third-party web site screen without requiring customer input, in accordance with a first embodiment of the invention.

FIG. 6 is a flow chart showing a method of updating a third-party web site screen without requiring customer input, in accordance with a first embodiment of the invention. In this embodiment, the third-party web page and the merchant server are in the same address domain. Alternately, this embodiment could be used in a situation where the AJAX domain restrictions do not apply. The steps are similar to those of FIG. 5, although no intermediate third-party web server 110 is required.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method, comprising:

presenting, by a customer device, a third-party web page having transaction information describing a transaction between a customer and a merchant, the transaction information provided by the merchant and the third-party webpage served to the customer device by a third-party server;

receiving, by the customer device from the customer, order information relating to the transaction;

asynchronously sending, by the customer device as instructed by the third-party web page, the order information to a database server without requiring a synchronous request by the customer for the order information to be sent, the third-party server serving the third-party web page and the database server being in different domains; and receiving, by the customer device from the database server, merchant-specific information in accordance with the order information sent.

2. The method of claim 1, further comprising:
querying, by the customer device through the third-party web page, the customer for an address; and
wherein asynchronously sending the order information to the database server includes asynchronously sending the address to the database server.

3. The method of claim 2, wherein querying the customer for an address includes having the customer fill out the address online.

4. The method of claim 2, wherein querying the customer for an address includes receiving the address as a parameter in an http call.

5. The method of claim 2, wherein asynchronously sending the address to the database server without requiring a synchronous request by the customer for the order information to be sent includes calling a method of an AJAX object that calls the database server.

6. The method of claim 2, wherein asynchronously sending the address to the database server without requiring a synchronous request by the customer for the order information to be sent includes the customer device as instructed by the third-party web page calling a method of an AJAX object that calls the database server.

7. The method of claim 1, wherein the transaction information identifies an item that the customer has selected to purchase from the merchant.

8. The method of claim 1 wherein asynchronously sending the order information includes sending content of a shopping cart involved in the transaction.

9. The method of claim 1 wherein asynchronously sending order information includes sending an address received from the customer.

10. The method of claim 1 wherein asynchronously sending order information includes identifying at least one item selected for purchase by the customer from the merchant.

11. The method of claim 1, wherein the merchant-specific information includes a shipping cost for the transaction.

12. The method of claim 1, wherein the merchant-specific information includes a final tax value.

13. The method of claim 1, wherein the merchant-specific information includes a tax amount incorporating information about what types of items are taxable.

14. The method of claim 1, wherein the merchant-specific information includes a coupon amount.

15. The method of claim 1, wherein the merchant-specific information includes a catalog code.

16. The method of claim 1, further comprising determining by the third-party web page, the customer's total in accordance with a transaction cost and the merchant-specific information.

17. The method of claim 1, wherein the merchant-specific information is tax information.

18. The method of claim 1, wherein the merchant-specific information is received via an http request from the database server.

19. The method of claim 1, wherein asynchronously sending, by the third-party web page, the order information to a database server without requiring a synchronous request by the customer for the order information to be sent comprises communicating the order information relating to the transaction by the customer device to the third party server and the third party server communicating the information to the database server.

20. The method of claim 1, wherein receiving, by the customer device from the database server, merchant-specific information in accordance with the order information sent comprises receiving the information from the database server by the third party server and communicating the information from the third party server to the customer device.

21. The method of claim 1, further comprising presenting, by the customer device, the merchant-specific information in the third-party web page, the presented merchant-specific information replacing estimated shipping information.

22. The method of claim 1, further comprising presenting, by the customer device, the merchant-specific information in the third-party web page, the presented merchant-specific information replacing a blank shipping cost field.

23. The method of claim 1, further comprising charging the merchant for the method performed by the third-party web page.

24. The method of claim 1, wherein the third-party server stores credit card information for the customer and processes credit card transactions without sharing the credit card information with the database server.

25. A computer implemented method performed by a customer device, comprising:
presenting a third-party webpage having item information describing an item that a customer has selected to purchase from a merchant, the item information provided by the merchant;
querying the customer for an address;
receiving the address from the customer;
asynchronously sending, by the customer device as instructed by the third-party web page, the address to a third-party server in the same domain as the third-party web page without requiring a synchronous request by the customer for the information to be sent, the third-party server forwarding the address to a database server, the database server in a different domain than the third-party server and third-party webpage
receiving, from the third-party server, merchant-specific information for the item in accordance with the address, the merchant-specific information provided to the third-party server by the database server; and
presenting the merchant-specific information.

26. A computer program product, including computer instructions stored on a computer readable medium, the instructions when executed performing steps comprising:
presenting, by a customer device a third-party web page having transaction information describing a transaction between a customer and a merchant, the transaction information provided by the merchant and the third-party webpage served to the customer device by a third-party server;
receiving, by the customer device from the customer, order information relating to the transaction;
asynchronously sending, by the customer device as instructed by the third-party web page, the order information to a database server without requiring a synchronous request by the customer for the order information to be sent, the third-party server serving the third-party web page and the database server being in different domains; and
receiving, by the customer device from the database server, merchant-specific information in accordance with the order information sent.

27. A system, comprising:
a merchant device configured to allow a customer to initiate a transaction between the customer and a merchant;

a third-party server, for receiving from the merchant device, transaction information describing the transaction, for querying the customer for an address and for asynchronously sending the address to a database server without requiring a synchronous request by the customer for the information to be sent, the third-party server and the database server in different domains;

the database server receiving the address from the third-party server, for determining merchant-specific information in accordance with the address, and for sending the merchant-specific information to the third-party server.

28. The system of claim 27, further comprising a second database server sending to the third-party server, second merchant-specific information determined in accordance with the address, the second merchant-specific information having a different value than the merchant-specific information sent by the database server.

29. A computer implemented method, comprising:

receiving, by a third-party web server from a merchant, transaction information describing a transaction between a customer and the merchant;

transmitting, by the third party web server to a customer device, a third party web page for display on the customer device, the third party web page including the transaction information and prompting the customer to enter order information;

receiving by the third party web server from the customer device, order information entered by the customer, the order information asynchronously sent by the customer device to the third party-web server without requiring a synchronous request by the customer for the order information to be sent;

sending, by the third-party web server, the order information to a database server without requiring a request by the customer for the order information to be sent, the third-party web server and the database server being in different domains;

receiving, by the third-party web server from the database server, merchant-specific information in accordance with the order information sent; and sending, by the third party server to the customer device, the merchant-specific information for display in the third party web page.

30. A computer implemented method performed by customer device, comprising:

presenting a third party web page having transaction information describing a transaction between a customer and merchant, the transaction information received from the merchant;

querying the customer for personal information;

receiving the personal information from the customer;

asynchronously sending, by the customer device as instructed by the third-party web page, the personal information to a third-party server in the same domain as the third-party web page without requiring a synchronous request by the customer for the information to be sent, the third-party server forwarding the personal information to a database server, the database server in a different domain than the third-party server and third-party webpage;

receiving, from the third-party server, merchant-specific information for the transaction in accordance with the personal information, the merchant-specific information provided to the third-party server by the database server.

31. A computer implemented method, comprising:

transmitting, by a merchant server to a third-party web server, transaction information for the third-party web server to forward to a customer device for display in a third party web page, the transaction information describing a transaction between a customer and the merchant, the merchant sever and the third-party web sever in different domains;

receiving, by the merchant server from the third-party web server, order information entered by the customer, the order information asynchronously sent by the customer device to the third party-web server without requiring a synchronous request by the customer for the order information to be sent; and sending, by the merchant server to the third-party web server, merchant-specific information in accordance with the order information received for the third-party web server to forward to the customer device for display in the third party web page.

* * * * *